July 12, 1927. E. TYDEN Re. 16,678
DRY PIPE VALVE ACCELERATING DEVICE
3 Sheets-Sheet 1
Original Filed Aug. 25, 1923
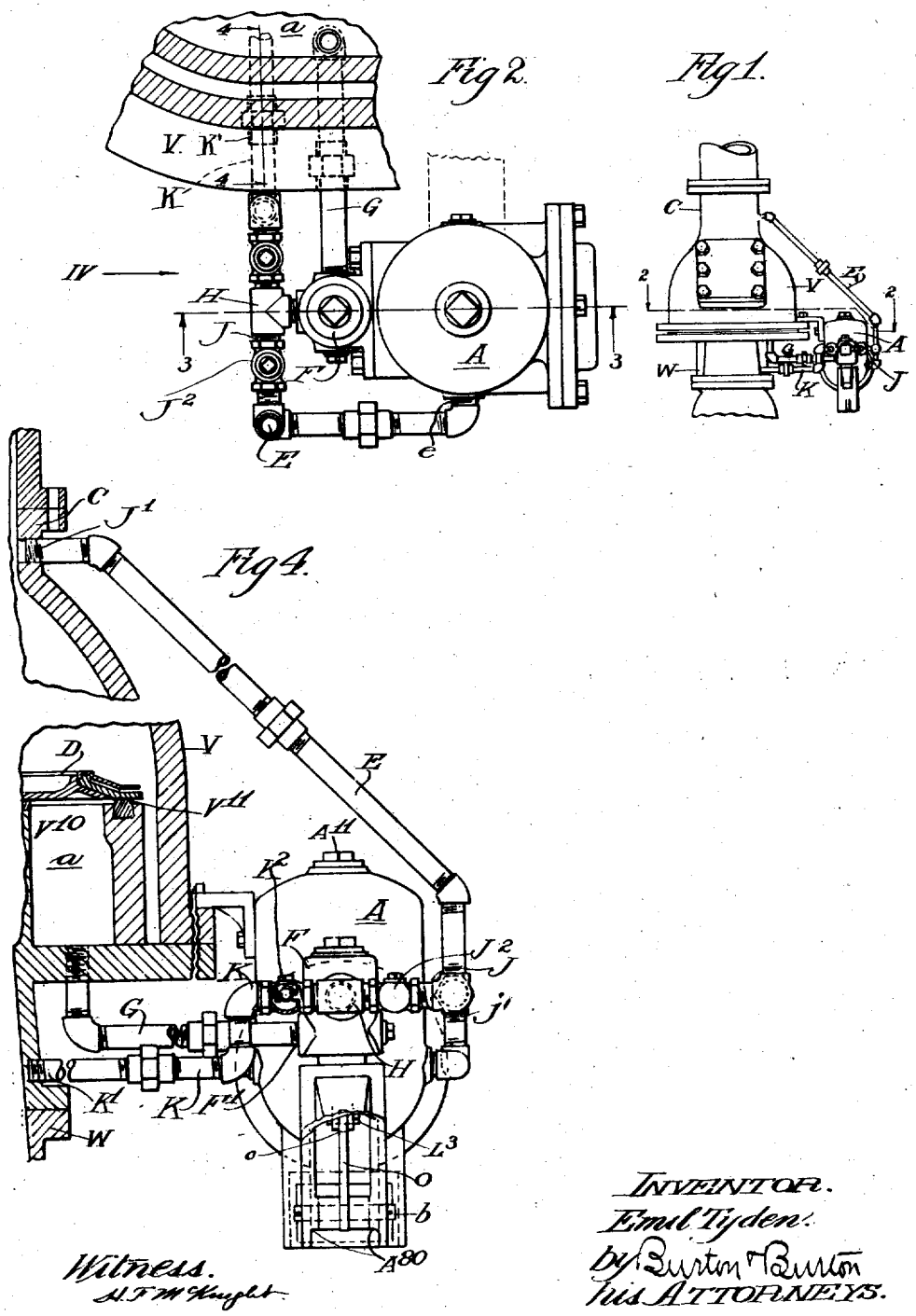

July 12, 1927.

E. TYDEN

DRY PIPE VALVE ACCELERATING DEVICE

Re. 16,678

3 Sheets-Sheet 2

Original Filed Aug. 25, 1923

Witness.
H. G. McKnight

Inventor.
Emil Tyden.
by Burton Burton
his Attorneys.

July 12, 1927. E. TYDEN Re. 16,678

DRY PIPE VALVE ACCELERATING DEVICE

3 Sheets-Sheet 3

Original Filed Aug. 25, 1923

INVENTOR.
Emil Tyden.
By Burton & Burton
his ATTORNEYS.

Reissued July 12, 1927. Re. 16,678

UNITED STATES PATENT OFFICE.

EMIL TYDEN, OF HASTINGS, MICHIGAN.

DRY-PIPE-VALVE ACCELERATING DEVICE.

Original No. 1,615,056, dated January 18, 1927, Serial No. 659,334, filed August 25, 1923. Application for reissue filed April 25, 1927. Serial No. 186,534.

The purpose of this invention is to provide an improved construction in a dry pipe sprinkler system for accelerating the opening of the dry pipe main valve upon the opening of a sprinkler head, with a further specific purpose of preventing the opening of the main valve upon the occurrence of a negligible leakage of the air system amounting to less than would occur through a single sprinkler head; and with an additional specific purpose of certain features of the construction, that the pressure introduced under the main valve for the acceleration contemplated shall be derived through from the air pressure region or from the water pressure region of the system according to which of these pressures is greater at the moment of operation of the device. The invention consists in the elements and features of construction shown and described, as indicated in the claims.

In the drawings:

Figure 1 is an elevation at the handhole side of a dry pipe main valve casing equipped with devices embodying this invention.

Figure 2 is a sectional plan view of the structure embodying the invention, section being made through the dry pipe main valve casing at the plane indicated by the line 2—2 on Figure 1.

Figure 4 is a partly sectional elevation looking in the direction of the arrow, IV, on Figure 2, the dry pipe main valve casing being shown in the section at the line 4—4 on Figure 2.

Figure 3:
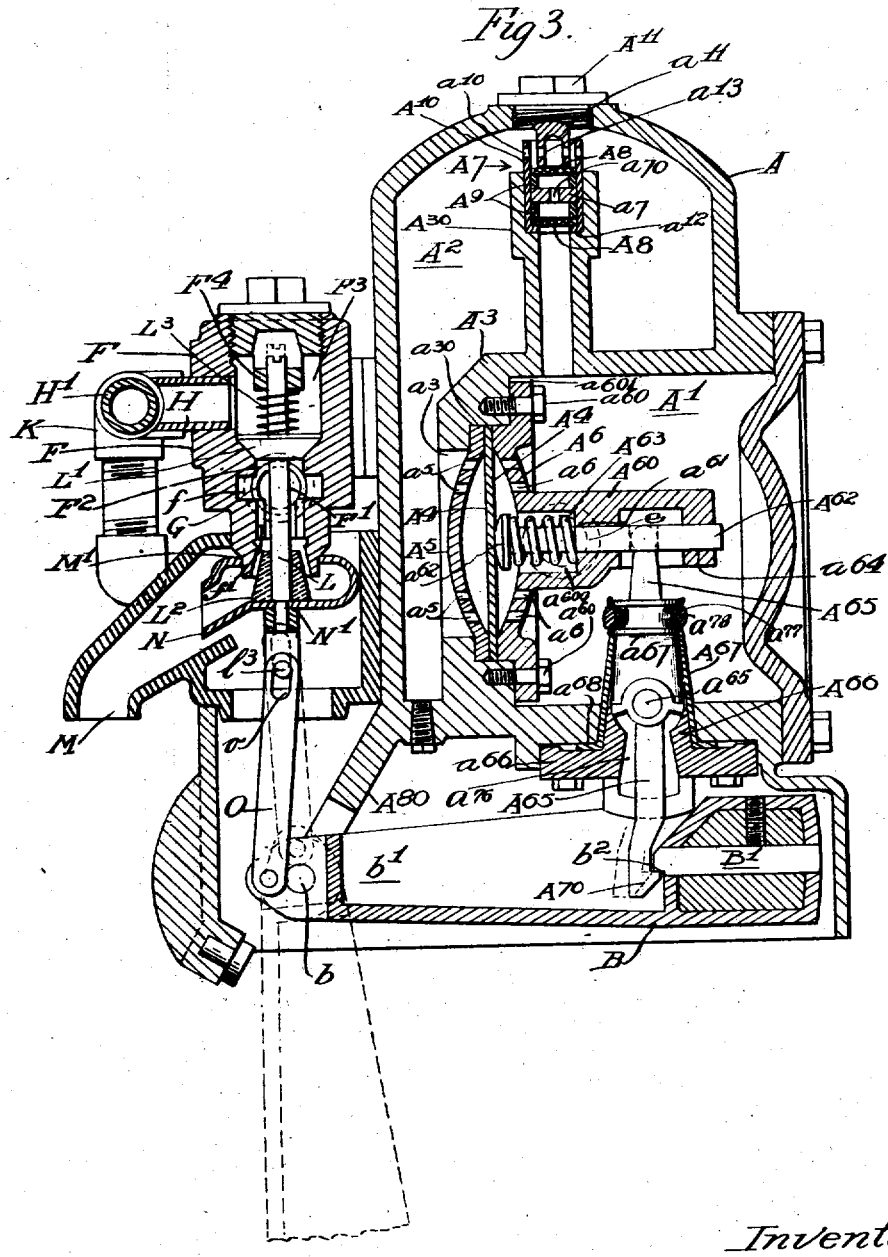
Figure 3 is a section at the line 3—3 on Figure 2, on a larger scale.

In the structure shown in the drawings, V is the dry pipe valve casing; W, the water inlead pipe; C, the pipe leading to the sprinkler system, which, in the normal condition of the apparatus, when set for its purpose, is occupied by air under compression. D is the dry pipe main valve having the usual construction for seating at two concentric seats, $V^{10}$ and $V^{11}$, between which there is the usual interseat chamber, *a*, in which the pressure is normally atmospheric, so that the super-atmospheric air pressure, operating above the valve, D, over the larger area defined by the outer seat, $V^{11}$, as compared with the area defined by the inner seat, $V^{10}$, over which the water pressure is operative, insures the valve, D, being held seated by the super-atmospheric pressure in the system of about 30 lbs. against water pressure in the main which may reach 100 lbs. When a sprinkler head is opened, causing reduction of the super-atmospheric pressure in the system, which eventually results in the dry pipe main valve, D, being opened by the water pressure and the water thereby being sent to the open sprinkler head, it is desirable that the opening of the valve should be delayed as little as possible after the sprinkler head is opened and the reduction of air pressure in the system begins; but when only a single sprinkler head is opened by the fire, it may require a very appreciable length of time for the air pressure to be reduced so as to permit the dry pipe main valve to open. One purpose of the present invention is to cause the amount of reduction of air pressure in the system which will be experienced almost instantly upon the opening of a single sprinkler head, to result in overcoming the differential pressure upon the upper side of the valve which holds it seated, so that the valve will open almost instantly upon the opening of the sprinkler head. This is effected by means of devices which are sensitive to the slight reduction of pressure which occurs almost instantly upon the opening of the sprinkler head, and which, responding to that slight reduction, operate to open communication from the region of air pressure above the dry pipe main valve, to the inter-seat or atmospheric pressure chamber below that valve. These devices are designed with a view to responding, as indicated, to the reduction of pressure which follows the opening of a single sprinkler head, while not responding to the less reduction of pressure which may result from minor negligible leakages in the system.

The construction, shown, is designed further with the view to utilizing for the purpose of accelerating the opening of the dry pipe main valve through the pressure derived from the air pressure region or that derived from the water pressure region of the system, according to which of these pressures at the moment is greater. In a modified form, shown in Figures 5 and 6, the construction is designed with the specific purpose of preventing the water which follows the air into the air pressure region of the system when operating upon the opening of the sprinkler head, from following the air also into the chambers of the accelerating device. The structure for these purposes will not be described.

There is provided a casing, A, having two chambers, $A^1$ and $A^2$, partitioned apart by the partition, $A^3$, which has an opening, $a^3$, closed by a diaphragm, $A^4$, mounted and clamped between two diaphragm casing members, $A^5$ and $A^6$. The entire structure comprising the diaphragm and its said casing members being mounted in the partition, $A^3$, at the opening, $a^3$, said partition being rabbeted around said opening, as shown at $a^{30}$, for seating the diaphragm casing, the diaphragm casing member, $A^6$, having a marginal flange, $a^{601}$, through which clamping bolts, $a^{60}$, take into the partition, $A^3$, for clamping the diaphragm between the casing members and clamping the diaphragm casing as a whole in the rabbet, $a^{30}$, so that the opening, $a^3$, in the partition, $A^3$, is completely closed by the diaphragm structure. The two chambers, $A^1$ and $A^2$, have restricted communications with each other through a screen or strainer device, indicated as to its entirety at $A^7$, consisting of a disc, $a^7$, having a relatively small aperture, $a^{70}$, at its center, said disc being positioned between two screens or strainers, $A^8$, $A^8$, spaced from the disc, $a^7$, at opposite sides thereof by spacing rings, $A^9$, $A^9$, the entire assemblage comprising the strainers, spacing rings and disc being fitted within a sleeve, $A^{10}$, which is machine fitted for lining the bore in the upper end of a tubular boss, $A^{30}$, which constitutes part of the partition, $A^3$. This tubular boss terminates at its upper end a little short of the top of the outer chamber or cavity, $A^2$, of the casing A, the said lining sleeve, $A^{10}$, being extended so as to protrude from the upper end of the boss, and at its protruding part having a plurality of ports, $a^{10}$. This arrangement of the protruded boss for carrying the strainers and restricted communication device described, is adopted for convenience of assembling the parts and securing the entire assemblage consisting of the strainers and disc, $a^7$, in the sleeve, $A^{10}$. For utilizing this arrangement for said purpose the casing A, has at its upper end a threaded aperture which is closed by a screw plug $A^{11}$, having at its inner end an axially hollow nipple, $a^{11}$, diametered considerably less than the internal diameter of the sleeve, $A^{10}$, for protruding into the upper end of said sleeve, and encountering the upper screen, $A^8$, and clamping the entire assemblage of screens, disc and spacing rings onto the interior flange, $a^{12}$, with which the sleeve, $A^{10}$, is provided at its lower end. The nipple, $a^{11}$, has a plurality of apertures, $a^{13}$, leading from its axial bore for affording communication from the interior of the screen device to the chamber, $A^2$, and thereby completing a communication from the chamber, $A^2$, through the screens and apertured disc, $a^7$, to the said chamber, $A^1$. The diaphragm casing members, $A^5$ and $A^6$, have each a plurality of ports, $a^5$ and $a^6$, leading respectively from the chambers, $A^2$ and $A^1$, to opposite sides of the diaphragm, $A^4$. The diaphragm casing member, $A^6$, has a central hub, $A^{60}$, axially chambered at $a^{600}$, and in the head of this hub at, $a^{61}$, there is mounted for sliding, thrusting movement a plunger, $A^{62}$, which has at its inner end an expanded head, $a^{62}$, bearing upon the center of the diaphragm, $A^4$, with a spring, $A^{63}$, coiled around the stem of said plunger, $A^{62}$, reacting at one end against the head, $a^{62}$, and at the other end against the head, $a^{61}$, of the hub, $A^{60}$, for holding the plunger pressing normally against the diaphragm, but preferably in the normal position of the rest of the parts not with sufficient force to deflect the diaphragm materially from its normal plane, though if desired, as for the purpose of giving greater range of thrust to the plunger in operation of the device as hereinafter described, the diaphragm may be normally somewhat deflected from its plane by the reaction of the spring. The hub, $A^{60}$, is extended beyond the head, $a^{61}$, to afford a second bearing at $a^{64}$ for the plunger, $A^{62}$, being apertured vertically between the head, $a^{61}$, and said bearing, $a^{64}$. In the interval between the two bearings of the plunger, said plunger is engaged with the upper end of a lever, $A^{65}$, which is fulcrumed at $a^{65}$ in a fitting, $A^{66}$, mounted on the bottom wall of the casing, A, by means of its flange, $a^{66}$, said fitting having a central aperture, $a^{76}$, through which the lever, $A^{65}$, protrudes from the casing, A. For permitting the lever to be thus mounted and protrude without possibility of air leakage from the casing at the aperture through which the lever protrudes, there is provided a flexible jacket, $A^{67}$, secured airtight at its upper end on an annular boss, $a^{67}$, with which the lever $A^{65}$, is provided as by an annular key, $a^{77}$, snapped around it, seating it in the peripheral groove, $a^{78}$, of said boss, $a^{67}$, and secured air-tight at its lower outwardly flanged end, $a^{68}$ by being clamped between the flange $a^{66}$ of the fitting $A^{66}$, and the lower surface of the bottom of the casing, A, around the margin of the aperture through which both the jacket, $A^{67}$, and the fitting, $A^{66}$, are inserted, and in which the jacket, $A^{67}$, serves as a packing for the joint between the fitting, $A^{66}$, and the circumferential wall of the aperture.

B is a weighted lever pivoted at $b$ on a lug, $A^{80}$, which projects from the casing, A, said lever extending normally in substantially horizontal position under the casing, A, and under the fitting, $A^{66}$, from which the lower end of the lever, $A^{65}$, projects into a channel cavity, $b^1$, formed in the upper side of the lever, B, for engagement with a catch nose, $b^2$, formed at the end of a steel inset $B^1$, mounted in the weighted end of the lever, B, the said lower end of the lever, $A^{65}$, being formed as a hook latch, as seen at $A^{70}$, the said hook latch being adapted to be engaged with the latch nose $b^2$ at the directly vertical or normal position of the lever, $A^{65}$, and to be disengaged from said catch nose to release the weighted end of the lever, permitting the said lever to fall, when the lever, $A^{65}$, is operated in the direction in which it will be operated by flexure of the diaphragm, $A^4$, which results from greater pressure reaching the diaphragm at the side at which it is in communication with the chamber, $A^2$, than the pressure operating upon it from the opposite side reaching it from the chamber, $A^1$.

The casing, A, is connected for communication of its chambers with the air pressure region of the dry pipe system, as indicated in Figures 1 and 4, by the pipe, E, leading from the air pipe, C, to the casing, A, and connected to the latter at $e$, (see Figure 2) whereby the immediate communication of the air pipe, C, with the casing is with the chamber, $A^1$, of the latter.

When thus connected the operation of the structure as thus far described may be understood as follows:

When the air pressure in the dry pipe system is developed to the desired or customary degree, say 30 lbs. per square inch, that pressure is immediately experienced in the chamber, $A^1$, and eventually through the restricting disc and screens, $A^7$ and $A^8$, in the chamber, $A^2$. It thus results that in the normal set-up of the system waiting and in readiness for operation for its purpose upon the opening of the sprinkler head by fire, the diaphragm, $A^4$, occupies its normal position exposed to equal pressures upon its opposite sides, and in this position the plunger, $A^{62}$, holds the lever, $A^{65}$, in position for engaging by the hook latch, $A^{70}$, the catch nose $b^2$ on the lever, B, and upholding said lever at horizontal position. Upon the reduction of pressure in the air pressure region of the system (air pipe, C) by the amount which will result from the opening of a single sprinkler head, that reduction of pressure being experienced almost instantly in the chamber, $A^1$, and not immediately in the chamber, $A^2$, it will result that the pressure in the chamber, $A^2$, remaining nearly unchanged at the higher degree, while that in chamber, $A^1$, is lowered will cause the diaphragm, $A^4$, to be deflected in direction for thrusting the plunger, $A^{62}$, outward and causing it to actuate the lever, $A^{65}$, for disengaging the hook latch, $A^{70}$, and releasing the weight, B, so that it will fall. Said weight, B, is connected for operating a valve which controls the admission of pressure from a pressure region or regions of the system to the interseat or atmospheric pressure chamber, $a$, of the dry pipe valve, as will now be described.

A fitting, F, is mounted upon the side of the casing, A, said fitting having a chamber, $f^1$, from which the port, $F^1$, leads by the pipe, G, to the interseat or atmospheric pressure chamber of the dry pipe valve, (see Figure 2) and a port, $F^2$, is connected by way of an enlarged passage, $F^3$, with a T-fitting, H, from the opposite ends of whose cross member, pipes, J and K, lead respectively to the air pressure and to the water pressure region of the system, being connected with said regions as seen at $J^1$ and $K^1$, respectively. The connection, $J^1$, being as a matter of convenience made as seen at $j^1$ through pipe, E, which connects air pressure region with the casing, A, as above described. In each of said pipe connections, J and K, there is interposed a check valve, said check valves being shown at $J^2$ and $K^2$, respectively, each of said check valves opening toward the T-fitting, and thereby for access of the pressure from either region to the chamber, $f^1$, and thereby to the interseat atmospheric pressure chamber, $a$. The connection of the pipe, G, to the interseat atmospheric pressure chamber is made at a port at the bottom of that chamber which would ordinarily constitute the drainage or water outlet port, which it is to be understood is necessary to be provided for vacating said interseat chamber of water with which it becomes occupied when the dry main valve is open, and also for admitting atmospheric pressure to said chamber in the normal set-up of the system. In order, therefore, that the connection described to this bottom port of the chamber, $a$, shall serve the necessary purposes of permitting drainage from and admitting atmospheric pressure to the chamber, $a$, the said pipe connection, G, to said chamber leads to the enlargement, $f$, of the chamber $f^1$, in the fitting, F, which leads to the port, $F^2$; and a valve stem, L, which carries a valve, $L^1$, for seating at the port, $F^2$, extends through said enlargement $f$, and below the same carries a valve, $L^2$, which seats at the lower end of the fitting, F, being seated by the upward movement of the valve stem which opens the valve, $L^1$. A spring, $L^3$, coiled around said stem, L, above the valve, $L^1$, reacts at its upper end against a guide bearing $F^4$, and at its lower end against the valve, $L^1$, for holding said valve normally seated. The fitting, F, is mounted, as stated, upon the side of the casing A, with its lower end having the seat for the valve $L^2$ protruding into a drain hood, M, which is also mounted upon the side of the casing, for enclosing or shielding a flexible drain spout, N, which has its upper side engaged water-tight at $M^1$ with the terminal boss of the fitting, F, in which the seat for the valve, $L^2$, is formed, and which is carried by the engagement of its lower side with the valve stem, L, as seen at $N^1$. A link, O, connects the short arm of the lever, B, with the lower end of the valve stem, L, lost motion as between the link and the valve stem being provided by the slot, *o*, in the link at its connection with the pivot pin, $l^3$, at the end of the valve stem.

The operation of the connections described may be understood as follows:

At the normal set-up of the device, the valve, $L^1$, is held seated by the spring, $L^3$, and the valve, $L^2$, is at open position, permitting free drainage from the interseat chamber, *a*, by way of the pipe, G, past said valve, $L^2$, the flexible spout, N, delivering the drainage into the fixed drainage spout, M. Upon the operation of the diaphragm device contained in the casing, A, which results from lowering of air pressure in the system, the weight, B, falling and thrusting upward the link, O, seats the valve, $L^2$, and opens the valve, $L^1$. The seating of the valve, $L^2$, closes atmospheric communication of the chamber, *a*, and the opening of the valve, $L^1$, puts said chamber in communication with both the air pressure and the water pressure regions of the system through the pipes, J and K, respectively. If the air pressure is greater than the water pressure, the check valve, $K^2$, in pipe line, K, will be closed and the pressure which will reach the chamber, *a*, will be the air pressure only. On the other hand, if the water pressure is greater than the air pressure, the valve, $J^2$, will be closed and the water pressure only will reach the chamber, *a*. In either case the pressure thus admitted under the dry pipe main valve overcoming the differential pressure which has previously been holding that valve seated will permit it to be opened immediately by the water pressure.

When the entire system is to be reset the operator is required only to swing up the weighted lever, B, to horizontal position, causing it to retract the link, O, seating the valve, $L^1$, and opening the valve, $L^2$. In this movement the weight will become engaged with the latch terminal, $A^{70}$, of the lever, $A^{65}$, and will be thereby locked in horizontal position; for it will be understood that the pressures in the chambers, $A^1$ and $A^2$, will have become equalized by the gradual leakage through the restricted port, $a^{70}$, and the diaphragm, $A^4$, will have returned to its normal position permitting the plunger, $A^{62}$, to be retracted by the spring, $A^{63}$, thereby restoring the lever, $A^{65}$, to its normal position for engaging the catch nose, $b^2$, of the weight lever when the latter is swung up to horizontal position as described.

Figure 5:
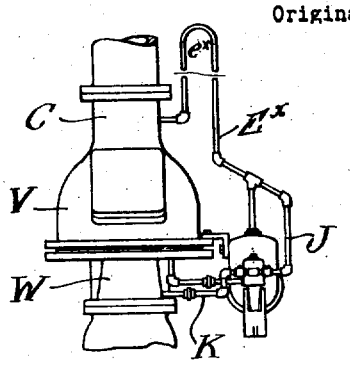
Figure 5 is a view similar to Figure 1 showing a modification.
Figure 6:
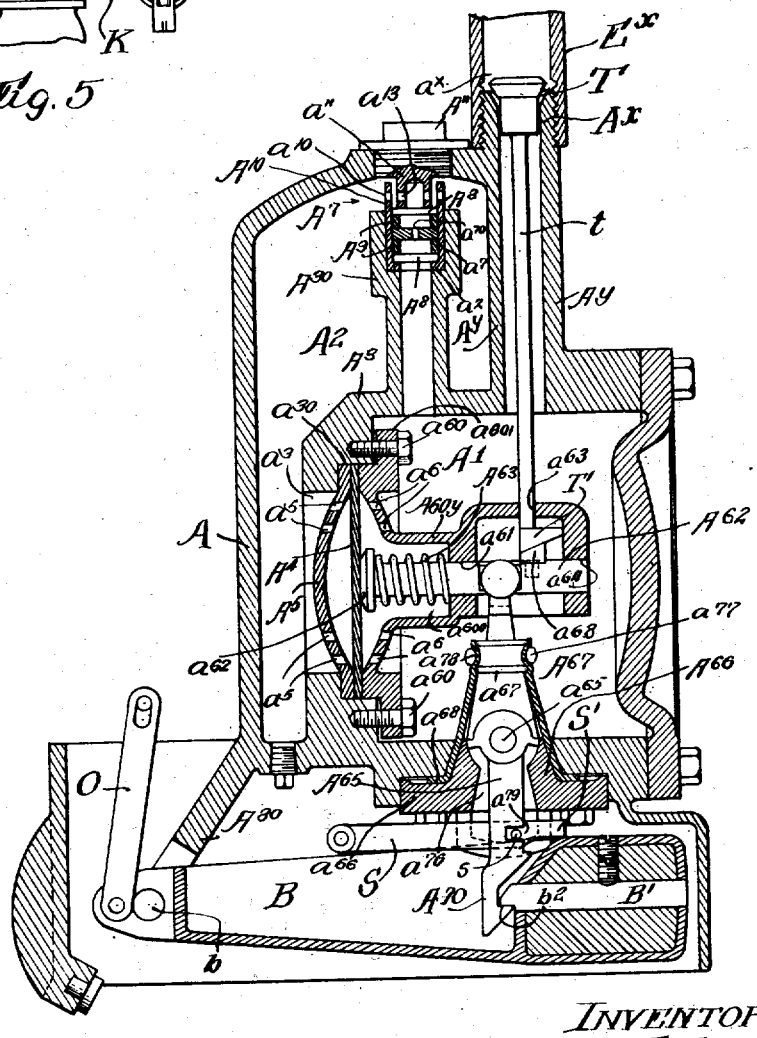
Figure 6 is a view similar to Figure 3 showing the same modification.

In Figures 5 and 6, there is shown a modification designed to prevent the chambers of the casing, A, becoming occupied by the water which might follow the air into that casing when it has followed and displaced the air in the sprinkler system. In this modification, the pipe, $E^x$, which affords communication of the casing, A, with the air pressure region of the system, comprises an inverted U bend, $e^x$, which constitutes an air trap tending when the system becomes filled with water, to prevent the water passing through the conduit leading to the casing, A, and occupying the latter. This air trap suffices for the purpose when the water pressure is only enough greater than the previously present air pressure to compress the air in the pipe, $E^x$, and in the casing, A, so as to permit the water to rise to and not flow over the top of the bend of the inverted U trap; and the conditions may permit making this trap high enough to prevent the water passing over under any degree of water pressure which the water connections may afford. But the necessity of an inconveniently high air trap for the purpose may be avoided by interposing a valve in the conduit which shall be seated by the pressure from the system and thereby limit the volume of air exposed to compression by the superior water pressure, so that the reduction of volume by that compression shall be taken care of by a comparatively short up-limb of the air trap; and for the purpose the pipe, $E^x$, is connected with the casing at a protruded nipple, $A^x$, which terminates a tubular boss, $A^y$, which extends through the chamber, $A^2$. At the outer end of the nipple, $A^x$, which extends through the chamber, $A^2$, so that its axial cavity leads from the outer end of said nipple, $A^x$, into the chamber, $A^1$, without communication with the chamber, $A^2$. At the outer end of the nipple, $A^x$, there is provided a seat, $a^x$, for a valve, T, whose stem, *t*, extends through the entire length of the hub or boss, $A^y$, and into the chamber, $A^1$, obtaining guidance at, $a^{63}$, in the side of the stem, $A^{60y}$, of the diaphragm casing within whose aperture between the guide bearings, $a^{61}$ and $a^{64}$, of the plunger said stem, *t*, carries an expanded cam footpiece, $T^1$; and a co-operating cam, $a^{68}$, is formed on the plunger, $A^{62}$, for holding the valve, T, at open position as seen in Figure 6, when the diaphragm is at normal position as seen in Figure 6. The slope of the co-operating cams, $T^1$ and $a^{68}$, is in the direction for permitting the valve, T, to descend and seat at the seat, $a^x$, provided at the upper end of the nipple, $A^x$, when the diaphragm is flexed for thrusting the plunger inward with respect to the chamber, $A^1$, and disengaging the hook latch, $A^{70}$, from the weighted end of the lever, B, for admitting pressure to the atmospheric pressure chamber, *a*, of the dry pipe main valve casing. The valve, T, being thus seated is held seated by the pressure in the sprinkler system so that the air in the pipe, $E^x$, is not displaced by the water when the water displaces the air in the sprinkler system and the water is thus prevented from obtaining access to the casing, A.

In order that the valve, T, may not be liable to be opened by the retraction of the plunger, $A^{62}$, which would normally result upon equalization of air pressure in the chambers, $A^1$ and $A^2$, which will occur in a few seconds after the valve, T, is closed, there is provided a latch, S, having an abutment, *s*, which, at the normal position of rest of the hook latch, $A^{70}$, stands in a notch, $a^{79}$, of the hook latch, and upon the swinging of the latter for disengagement from the weighted lever drops past the edge of the hook latch below said notch and engages said hook latch, $A^{70}$, for holding the hook latch at disengaged position similar to that shown at the dotted line in Figure 3, at which position it holds the plunger, $A^{62}$, at the position to which it is thrust by the flexure of the diaphragm, and prevents said plunger from being retracted and thus opening the valve, T, by the co-operation of the cams, $T^1$ and $a^{68}$, so long as the two latches, S and $A^{70}$, are engaged. When the apparatus is reset, the weighted lever, B, being swung up, encounters the end, $S^1$, of the latch, S, and disengages said latch from the hook latch, $A^{70}$, permitting the latter to engage the catch nose, $b^2$, of the weighted lever, B; and upon the plunger, $A^{62}$, being retracted, the cam, $a^{68}$, thrusts the valve, T, up to open position.

An important function of the accessibility between the connections of the diaphragm, $A^4$, and the pressure-admitting valve, $L^1$, is that when it is desired to test the condition of the air connections between the two chambers at opposite sides of the diaphragm, particularly as to whether the restricted orifice, $a^{70}$, through which the pressure is communicated between the chambers for equalizing is free of obstruction, or, on the contrary, is obstructed, the attendant, relieving a portion of the air pressure in the system by opening the vent valve, always present but not shown in the drawings, will cause the diaphragm to be moved toward the chamber, $A^1$, causing the latch, $A^{70}$, to be disengaged from the weighted lever, B, whereupon the attendant up-holds the weighted lever and thereby prevents the opening of the valve, $L^1$, which controls the admission of pressure to the interseat chamber, *a*, and thereby prevents the opening of the water main valve and the flooding of the system; and then, after an interval sufficient for equalizing the pressure between the two chambers, $A^1$ and $A^2$, if the orifice, $a^{70}$, is unobstructed, the diaphragm operates to re-engage the latch, $A^{70}$, with the weighted lever, B. If the orifice, $a^{70}$, is clear of obstruction so that the equalization of pressure between the two chambers has actually occurred, the latch will re-engage and hold the weighted lever; but if, on the contrary, the orifice, $a^{70}$, is obstructed so that the equalization has not occurred, although the attendant may forcibly engage the latch with the weighted lever, the reaction of the diaphragm exposed to greater pressure in the chamber, $A^2$, than in the chamber, $A^1$, will immediately disengage it; and thus the attendant will be advised of the obstructed condition requiring immediate attention in order to put the device in operative condition. In actual practice, it is considered essential to test devices for this purpose very frequently because of the liability of the restricted orifice between the two chambers becoming obstructed; and it is highly undesirable that the system should be flooded every time this inspection or testing is necessary. It will be understood that if the test indicates the obstruction of the orifice and the necessity for removing the plug, $A^{11}$, for obtaining access to the orifice, $a^{70}$, to clear it of obstruction, the weighted lever, B, will be secured in position for avoiding unseating the valve, $L^1$, by any convenient temporary expedient, such as tying a cord around the end of the hood which encloses the lever at its up-held position.

I claim:

1. In a dry pipe sprinkler system in combination with a dry pipe main valve constructed for exposing differential areas to the water and air pressure respectively at its opposite sides, and having for that purpose at the water inlet side a chamber in which the pressure is normally substantially atmospheric; a passage leading from the region of one of said pressures to said chamber; a valve controlling said passage; an expansible and collapsible device exposed to air pressure from the system reaching two different areas of the movable wall of said device through two ports affording unequal access to said areas; whereby change of air pressure in the system causes temporarily unequal pressures at said different areas of said movable wall; a casing in which said device is contained which is closed except as to its communication with the air pressure region of the system, and connections operated by the moving wall of said device for controlling said pressure-passage-controlling-valve, said connections comprising parts which are accessible exteriorly of said casing for manipulation at will for testing said device.

2. In a dry pipe sprinkler system in combination with a dry pipe main valve constructed for exposing differential areas to the water and air pressure respectively at its opposite sides, and having for that purpose at the water inlet side, a chamber in which the pressure is normally substantially atmospheric; a passage leading from the region of one of said pressures to said chamber; a valve controlling said passage; an expansible and collapsible device exposed to air pressure from the system reaching the different surfaces of a movable wall or diaphragm of said device through two ports affording unequal access; whereby change of air pressure in the system causes temporarily unequal pressures at different areas of said movable wall; a casing in which said device is contained which is closed except as to its communication with the air pressure region of the system, and means operated by the moving wall of said device extending air-tight through the casing wall and exterior connections from said means for operating said pressure-passage-controlling valve, said exterior connections being accessible for actuation at will.

3. In the construction defined in claim 1, foregoing, the atmospheric pressure chamber having a drainage port; a valve which controls said port, the connections for operating the pressure-passage-controlling valve being connected for operating said drainage-controlling valve for closing the latter when it opens the former.

4. In the construction defined in claim 1, foregoing, the valve operating connection comprising a weighted lever and connections therefrom for opening the pressure-passage-controlling valve by gravity-caused movement of said lever, and a latching device for holding the lever against such gravity-caused valve-opening movement, connection from the diaphragm-operated means being made to said latching device for releasing the same to permit the weighted lever to fall.

5. In a dry pipe sprinkler system, in combination with a dry pipe main valve constructed for exposing differential areas to the water and air pressures respectively at its opposite sides and having for that purpose at the water inlet side, a chamber in which the pressure is normally substantially atmospheric, passages from the regions of air pressure and water pressure respectively leading to said atmospheric pressure chamber, one-way-seating valves in said passages respectively, opening toward said chamber and seating to prevent backflow or pressure toward said pressure regions respectively; independent valve means controlling the communication of said passages with said atmospheric pressure chamber and means operated by reduction of pressure in the air pressure region of the system for controlling said independent valve means.

6. In the construction defined in claim 1, foregoing, a valve which controls communication from the air presssure region to the casing adapted to be held seated by said pressure, the operating connections from the moving wall of the expansible and collapsible device being adapted for holding said valve open against said pressure at the normal position of said wall.

7. In the construction defined in claim 1, foregoing, a valve controlling the connection from the air pressure region to the casing adapted to be held seated by said air pressure; the operating connections from the moving wall of the expansible and collapsible device being adapted for holding said valve open against said pressure at the normal position of said wall and means for releasing the valve for closing upon a movement of said wall for causing the admission of pressure to the atmospheric pressure chamber.

8. In the construction defined in claim 1, foregoing, a valve controlling the connection from the air pressure region to the casing adapted to be held seated by said pressure; the operating connections controlled by the moving wall of the expansible and collapsible device being adapted for holding said valve open against said pressure at the normal position of said wall adapted to release the valve for closing upon the movement of said wall for operating the connections for causing admission of pressure to the atmospheric pressure chamber; releasable automatic means for locking the operating connections, for actuating said valve, at closed position of the valve, and means for releasing said automatic locking means operatively associated with the means for resetting the apparatus at closed position of the pressure-admitting valve.

9. In the construction defined in claim 1, foregoing, the casing comprising two chambers between which the expansible and collapsible device is mounted, one chamber having communication to one side and the other having communication to the other side of the moving wall of said device; said chambers having restricted communication with each other, the communication of the air pressure region being directly with one of said chambers and indirectly with the other through said restricted communication; the operating connections from the moving wall of said device extending in the first mentioned of said chambers having the direct communication, and comprising means extending out through the exterior wall of said direct communication chamber, for controlling the pressure admitting valve.

10. In the construction defined in claim 1, foregoing, the exterior connections for controlling the pressure-admitting valve being adapted also, by means of the means extending air-tight through the casing wall, for resetting the operating means within the casing at normal position simultaneously with setting the pressure admitting valve at closed position.

11. In a dry pipe sprinkler system, in combination with a dry pipe main valve, constructed for exposing different areas to the water and air pressures respectively at its opposite sides, and having for that purpose, at the water inlet side, a chamber in which the pressure is normally substantially atmospheric; a passage leading from the region of one of said pressures to said chamber; a valve controlling said passage; an expansible and collapsible device exposed to air pressure from the system reaching different areas of the movable wall of said device through ports affording unequal access and operating connections from the moving wall of said device for controlling the pressure passage-controlling valve for opening the same upon predetermined difference of pressures on the moving wall of said device, the conduit from the air pressure region to said device comprising an air trap for preventing access of water to said device.

12. In a dry pipe sprinkler system, in combination with a dry pipe main valve, constructed for exposing different areas to the water and air pressure respectively at its opposite sides, and having for that purpose, at the water inlet side, a chamber in which the pressure is normally substantially atmospheric; a passage leading from the region of one of said pressures to said chamber; a valve controlling said passage; an expansible and collapsible device exposed to air pressure from the system reaching different areas of the movable wall of said device through ports affording unequal access; operating connections from the moving wall of said device for controlling the pressure passage-controlling valve; a valve in the conduit from the air pressure region to said device adapted to be seated by pressure from the system, and operating connections from the moving wall of said device for holding said valve open against said pressure at the normal position of said wall under conditions of equal pressure at the two areas thereof.

13. In a dry pipe sprinkler system, in combination with a dry pipe main valve, constructed for exposing different areas to the water and air pressures respectively at its opposite sides, and having for that purpose, at the water inlet side, a chamber in which the pressure is normally substantially atmospheric; a passage leading from the region of one of said pressures to said chamber; a valve controlling said passage; an expansible and collapsible device exposed to air pressure from the system reaching different areas of the movable wall of said device through ports affording unequal access; operating connections from the moving wall of said device for controlling the pressure passage-controlling valve for opening the same upon predetermined difference of pressures on the moving wall of said device, the conduit from the air pressure region to said device comprising an air trap for preventing access of water to said device; a valve in said conduit between the air trap and the casing cavity adapted to be seated by pressure from the air pressure region, and connections from the moving wall of said device for holding said valve open against said pressure at the normal position of said wall.

14. In a dry pipe sprinkler system in combination a dry pipe main valve constructed for exposing areas at its opposite sides to pressures of different degree and having for that purpose at one side a chamber in which the pressure operating on the valve is normally atmospheric, a valve which controls the admission to said chamber of pressure from a super-atmospheric pressure region of the system; a chambered device which is expansible and contractible as to its chambering, having for that purpose a movable chamber wall exposed to pressure from the system reaching two different areas of said movable wall through two ports affording unequal access of pressure, whereby change of air pressure in the system causes temporarily unequal pressure at said different areas of said movable wall, and the movement of said movable wall from normal position; means exterior to said expansible and collapsible chamber operatively connected with said movable wall and with said pressure admitting valve for causing the movement of said wall to operate said valve, said operating connections being accessible for manual control and comprising means enabling the movable wall to move independently of said valve when said operating connections are thus controlled, said connections also enabling manual movement to restore the movable wall to normal position; whereby without causing the admission of water to the system the condition of the air connections for causing the proper movement of the movable wall may be tested.

15. In combination with a dry pipe sprinkler system, a device for an auxiliary purpose connected for communication with the air pressure region of the system and adapted to be set in operation by decline of pressure in said region, said device comprising a chamber to which said pressure has access, a movable part mounted for movement in response to changes in said pressure reaching said chamber, and mechanical connections from said movable part for performing the auxiliary function of said device, said connections comprising a part extending from within said chamber and protruding air-tight out through the wall thereof, and other parts exterior to said chamber brought into operation for said auxiliary function by said exterior protruding part, said exterior parts being accessible for manipulation both for reacting on said interior movable part and for performing said auxiliary function.

16. The construction defined in claim 15, foregoing, having the exterior protruding part pivotally mounted in the chamber wall through which it protrudes.

17. In the construction defined in claim 15, foregoing, the means for rendering the protruding part air-tight at its emergence to the exterior of the chamber consisting of a flexible jacket enclosing a portion of the length of the protruding part, and at its opposite ends respectively clamped air-tight to said part and to the wall of the chamber at the margin of the aperture therein through which said part protrudes.

18. In the construction defined in claim 15, foregoing, said protruding part being pivotally mounted in the wall of said chamber at the aperture through which it protrudes and exteriorly formed as a catch for engaging said other exterior parts for locking the latter out of operating position against movement for said auxiliary function, the movement derived by said protruding part from its actuating connections being adapted to disengage said catch from said exterior parts.

In testimony whereof, I have hereunto set my hand at Chicago, Illinois, this 18th day of April, 1927.

EMIL TYDEN.